Feb. 14, 1956 K. C. ENVOLDSEN 2,734,766
SHRIMP HOLDER
Original Filed July 17, 1947

INVENTOR
KARL C. ENVOLDSEN
BY
McCoy, Greene & TeGrotenhuis
ATTORNEYS

United States Patent Office

2,734,766
Patented Feb. 14, 1956

2,734,766

SHRIMP HOLDER

Karl C. Envoldsen, Cleveland, Ohio

Original application July 17, 1947, Serial No. 761,573, now Patent No. 2,622,270, dated December 23, 1952. Divided and this application October 14, 1952, Serial No. 314,659

2 Claims. (Cl. 294—25)

This invention relates to apparatus for treating shrimp preparatory to eating. This application is a divisional application from my copending application Serial No. 761,573, filed July 17, 1947, now U. S. Patent No. 2,622,270.

It is an object of the present invention to provide apparatus for treating shrimp in which shrimp may be treated quickly and economically to effect complete removal of the sand vein or other foreign material and to preserve during heat treatment the delicate coloring, firm texture and tasty flavor desired when eating shrimp.

Presently known processes for automatically or semi-automatically handling shrimp to accomplish the removal of the sand vein, and to clean and prepare them for eating, involve the handling of the shrimp with the shells on, presumably to avoid injury to the soft, fragile body of the shrimp. The vein removal is generally accomplished by a rotary cutting tool having peripheral teeth, the width of the wheel corresponding to the average width of the vein. The cutter is advanced into the shrimp and mills or tears a channel, removing, to a predetermined depth, portions of shell, vein, and adjacent flesh from the shrimp body. Generally this does not accomplish a thorough and clean removal of the sand vein. Due to the variation in the size of shrimp the sand vein may not always be located in the proper size and will vary in depth, so that a cutter of this type will invariably remove insufficient vein or too much of the flesh adjacent the vein or both. In many instances this type of treatment severely mutilates the tender flesh of the shrimp body, which mutilation will accelerate the time within which the shrimp will spoil.

The present invention has for an object the complete removal of the vein and other foreign material from the shrimp body without damage to the shrimp body. According to the present invention the removal may be accomplished from shrimp of varying size, with each shrimp given the treatment proper for its size to accomplish complete removal without mutilation.

A further object is to prepare shrimp for eating in which the cleaning and deveining may be accomplished quickly so that the time during which the shrimp are not subjected to cooling temperatures, which will preserve and greatly retard spoilage, is a minimum.

Another object of the present invention is to provide apparatus for treating shrimp which will provide a superior finished product, being a complete shrimp with a minimum of damage to the flesh.

Other objects and advantages will become apparent from the following detailed description in which.

A preferred embodiment of the process of the present invention comprises the following sequence of operations in treating the shrimp body preparatory to eating. The shell of the shrimp is removed and it is loaded into a suitable holder, preferably along with a plurality of other shelled shrimp. In their supported position the flesh of the shrimp covering the sand vein is slit to or partially through the sand vein. The nature of the slitting and the nature of fresh shrimp flesh causes the flesh along the margin of the slit to recede, thus exposing the sand vein for ready removal. The vein may then be removed in a gentle fashion so as not to remove or multilate the surrounding flesh. The body of the shrimp is washed, removed from the holder, and immersed in a liquid where it may be subjected to heat treatment or cooking in order to prepare it for eating. After the heat treating step the shrimp are cooled, drained and promptly returned to refrigeration so that they will remain fresh and crisp until desired for sale or use.

Figure 1:
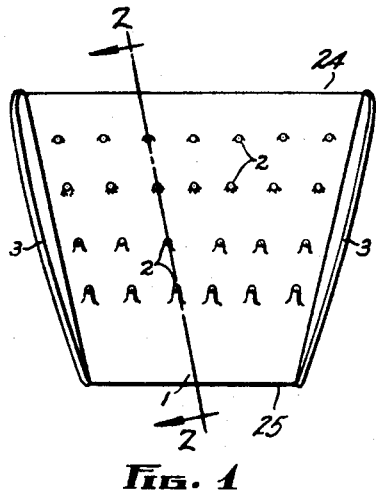
Fig. 1 is a plan view of a holder embodying the present invention adapted to hold a plurality of shrimp bodies while the vein of the shrimp is removed.
Figure 2:
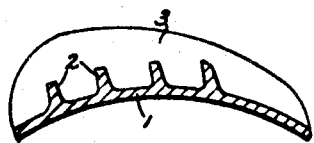
Fig. 2 is a cross sectional view of the holder shown in Fig. 1 taken along line 2—2 of Fig. 1.

Figs. 1 and 2 show a suitable form of holder of the present invention. It may be seen that the holder comprises a channel-shaped member having a curved supporting surface 1 from which a plurality of studs or prongs 2 project. These studs should be sufficient to prevent movement of the shrimp during treating but should not be shaped to catch, tear, or mutilate the shrimp body. It has been found that a frusto-conical pin flattened at its top, such as by filing, is especially satisfactory for holding the shrimp against movement without rupturing or tearing the flesh. In addition to being convexly curved the supporting surface 1 is shown as tapering from a wider portion 24 adapted to accommodate the head ends of the shrimp to a narrower portion 25 adapted to accommodate the tail ends of the shrimp bodies. It is also provided with upstanding sides or side portions 3 of any suitable shape. It is preferred to design the holder so that it will accommodate a plurality of shrimp, such as, for example, 4 to 6, so that the operations of slitting and removing the sand vein can be accomplished for several shrimp at the same time. Further, by designing the holder to accommodate a plurality of shrimp, the shrimp will all fit snugly between the sides 3 of the holder, due to the variations from the average size of the shrimp. For ease in handling it is desirable to use a holder, shaped as shown in Figs. 1 and 2, so that it may be readily accommodated to the palm of the hand.

The holders may be formed of any suitable material which is sufficiently rigid to hold the shrimp in place during the treating and which will also withstand heat such as 212° F., in order that the holders may be boiled, steamed, or otherwise sterilized periodically, so that the shrimp will not be exposed to unsanitary contaminants during the treating operation. Holders made from cast metal, such as aluminum, magnesium, or alloys thereof, have been found satisfactory.

Figure 4:
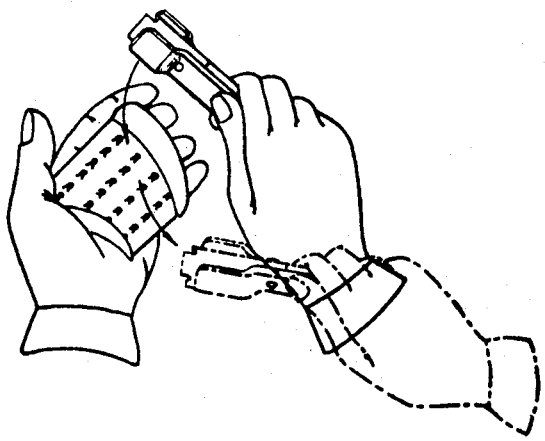
Fig. 4 is a diagramatic sketch illustrating a preferred method of utilizing the shrimp holder and tool previously shown in Figs. 1 through 3.

The slitting operation may be readily and quickly accomplished by supporting a holder filled with shelled shrimp in one hand and passing the cutting edge of a slitting tool along the central top portion of the back of the shrimp, from the head toward the tail, employing an arcuate motion such as that indicated in Fig. 4. This particular motion is desirable since the sand vein is generally more deeply embedded in the region of the tail of the shrimp, and by slightly rotating the slitting tool during the cutting of the flesh superposed above the sand vein a greater depth of cut at the end of the stroke may be obtained.

This slitting operation may be repeated until each of the shrimp in the holder has the flesh above the sand vein severed by a thin, sharp cutting edge. Since the body of a fresh shrimp is firm and relatively elastic, this severing of the flesh will in a very short time result in the edges of the flesh adjacent the slit drawing back away from each other and thus revealing the sand vein.

The removal of the vein may then be readily accomplished by disengaging it at one end from the body of the shrimp and by a gentle action rolling the sand vein upon itself and finally completely removing it from the shrimp body. The sand vein does not possess very great tensile strength and is generally too weak and irregular in diameter to withstand the pulling at one end to disengage it from the body. It has been found that a more complete removal can be effected by gently rolling the vein upon itself. Further, the gentle action required to roll the vein upon itself facilitates effective removal without mutilating or removing the flesh of the shrimp body to any appreciable or objectionable degree.

Figure 3:
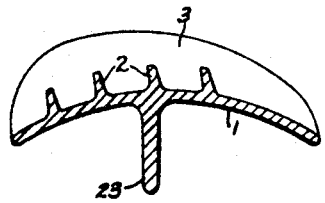
Fig. 3 is an enlarged sectional view, similar to Fig. 2, showing a modified form of shrimp holder.

Fig. 3 illustrates a modified form of holder similar to that shown in Figs. 1 and 2 except that in the central portion of the arcuate supporting surface 1 and at the under side thereof a transverse rib 23 is provided for more ready gripping of the holder in the palm of the hand during the shrimp loading, slitting, and vein removing operations.

By the present invention a superior shrimp product is obtained. The vein removal is extremely effective so that the treated product is free from the displeasing portions of the unremoved vein which, being dark in color, have a marked contrast with the pink and white flesh of the shrimp. The consistency or texture of the finished shrimp is greatly improved over that of other known treating processes and, in addition, each shrimp is complete since in accomplishing the vein removal no portion of the shrimp flesh is removed.

It is to be understood that the foregoing detailed description is for the purpose of illustration and explanation and is not to be considered as limiting the scope of the invention as defined in the appended claims.

What I claim is:

1. A holder to support the shelled bodies of a plurality of shrimp which comprises a longitudinally-curved, channel-shaped member having a wider portion at one end to accommodate the head ends of a plurality of shrimp bodies and a narrower portion at its other end to accommodate the tail ends of said shrimp bodies, side members on the convex side of said channel-shaped member extending along opposite longitudinal edges to hold the outermost of said shrimp bodies, and a plurality of frusto-conical projections on the convex side of said channel-shaped member to engage said shrimp bodies and restrain movement thereof.

2. A holder for holding the shelled bodies of a plurality of shrimp comprising a channel-shaped member with a longitudinally curved supporting surface having a wider portion at one end adapted to accommodate the head ends of shrimp and a narrower portion at other end adapted to accommodate the tail ends of the shrimp, upstanding side portions along the longitudinal edges of said supporting surface, and a plurality of studs on said supporting surface, said upstanding side portions and projections being on the convex side of said supporting surface.

References Cited in the file of this patent

UNITED STATES PATENTS

| 767,918 | Thomas | Aug. 16, 1904 |
| 946,159 | Smetana | Jan. 11, 1910 |
| 2,496,062 | Morfesi | Jan. 31, 1950 |

FOREIGN PATENTS

| 247,966 | Switzerland | Jan. 3, 1948 |
| 954,049 | France | June 6, 1949 |